(12) United States Patent
Galizio et al.

(10) Patent No.: US 10,808,106 B2
(45) Date of Patent: Oct. 20, 2020

(54) SATURATED TRIGLYCERIDE-CONTAINING RUBBER COMPOSITION, TIRES AND TIRE COMPONENTS CONTAINING THE RUBBER COMPOSITION, AND RELATED METHODS

(71) Applicant: Bridgestone Americas Tire Operations, LLC, Nashville, TN (US)

(72) Inventors: Benjamin C. Galizio, Kent, OH (US); Emily W. Demeter, Aiken, SC (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 140 days.

(21) Appl. No.: 15/775,068

(22) PCT Filed: Oct. 24, 2016

(86) PCT No.: PCT/US2016/058396
§ 371 (c)(1),
(2) Date: May 10, 2018

(87) PCT Pub. No.: WO2017/083082
PCT Pub. Date: May 18, 2017

(65) Prior Publication Data
US 2018/0327575 A1 Nov. 15, 2018

Related U.S. Application Data

(60) Provisional application No. 62/253,972, filed on Nov. 11, 2015.

(51) Int. Cl.
*C08L 9/06* (2006.01)
*B60C 1/00* (2006.01)
(Continued)

(52) U.S. Cl.
CPC ............. *C08L 9/06* (2013.01); *B60C 1/00* (2013.01); *B60C 1/0016* (2013.01); *C08K 3/013* (2018.01);
(Continued)

(58) Field of Classification Search
CPC ........ C08L 9/06; C08L 9/00; C08L 2205/025; C08L 2205/03; C08K 3/013; C08K 5/01;
(Continued)

(56) References Cited

U.S. PATENT DOCUMENTS

| 1,223,204 A | 4/1917 | Reynolds |
| 5,174,838 A | 12/1992 | Sandstrom et al. |

(Continued)

FOREIGN PATENT DOCUMENTS

| EP | 0561761 A1 | 9/1993 |
| EP | 0677548 A1 | 10/1995 |

(Continued)

OTHER PUBLICATIONS

JP 2000-071711 A, machine translation, EPO espacenet. (Year: 2000).*

(Continued)

*Primary Examiner* — Josephine L Chang
(74) *Attorney, Agent, or Firm* — Meredith E. Hooker; Jenny L. Sheaffer

(57) ABSTRACT

Disclosed herein are rubber compositions containing a saturated triglyceride component of specified melting point, as well as tires and tire components containing the rubber composition. Also disclosed are methods for improving the performance of a tire tread (such as by improving the wet traction) containing the rubber composition.

13 Claims, 2 Drawing Sheets

Tan δ versus temperature for Examples 1-4

(51) Int. Cl.
*C08L 9/00* (2006.01)
*C08K 5/11* (2006.01)
*C08K 3/013* (2018.01)
*C08K 5/01* (2006.01)
C08K 3/04 (2006.01)
C08K 3/36 (2006.01)

(52) U.S. Cl.
CPC ............... *C08K 5/01* (2013.01); *C08K 5/11* (2013.01); *C08L 9/00* (2013.01); *C08K 3/04* (2013.01); *C08K 3/36* (2013.01); *C08L 2205/025* (2013.01); *C08L 2205/03* (2013.01)

(58) Field of Classification Search
CPC .... C08K 5/11; C08K 3/04; C08K 3/36; B60C 1/00; B60C 1/0016
USPC ...................................................... 524/313
See application file for complete search history.

(56) References Cited

U.S. PATENT DOCUMENTS

| | | | |
|---|---|---|---|
| 5,252,649 | A | 10/1993 | Hausmann |
| 5,959,062 | A | 9/1999 | Ohtsuka et al. |
| 6,617,384 | B2 | 9/2003 | Wakabayashi et al. |
| 8,044,118 | B2 | 10/2011 | Sakaki et al. |
| 8,454,778 | B2 | 6/2013 | Majumdar et al. |
| 2005/0131127 | A1 | 6/2005 | Wilson, III |
| 2005/0222311 | A1 | 10/2005 | Richter et al. |
| 2010/0108219 | A1 | 5/2010 | Mruk et al. |
| 2010/0163150 | A1 | 7/2010 | Hirayama et al. |
| 2013/0096248 | A1 | 4/2013 | Thompson et al. |
| 2013/0267640 | A1 | 10/2013 | Lopez et al. |
| 2013/0289183 | A1 | 10/2013 | Kerns et al. |
| 2013/0345336 | A1 | 12/2013 | Lopitaux |
| 2014/0135424 | A1 | 5/2014 | Sandstrom et al. |
| 2014/0135437 | A1 | 5/2014 | Sandstrom et al. |
| 2015/0158993 | A1 | 6/2015 | Bastioli et al. |

FOREIGN PATENT DOCUMENTS

| | | | |
|---|---|---|---|
| EP | 2028022 A1 | | 2/2009 |
| JP | 2000071711 A | * | 3/2000 |
| JP | 2007-380623 A | | 11/2007 |
| JP | 2007308623 A | | 11/2007 |
| JP | 2009-096956 A | | 5/2009 |
| JP | 2010-138272 A | | 6/2010 |
| JP | 51-44031 B2 | | 2/2013 |
| JP | 2015067827 A | * | 4/2015 |
| WO | 2009-112220 A1 | | 9/2009 |

OTHER PUBLICATIONS

JP 2015-067827 A, machine translation, EPO espacenet. (Year: 2015).*
International Preliminary Report on Patentability and Written Opinion from application PCT/US2016/058396 dated May 15, 2018.
International Search Report dated Jan. 26, 2017 from application PCT/US2016/058396.
Cargill brochure "Agri-pure product portfolio > vegetable Waxes" copyright 2014.
Zambiazi, Rui Carlos et al., "Fatty Acid Composition of Vegetable Oils and Fats," B. Ceppa, Curitiba, vol. 25, No. 1, pp. 111-120, Jan./Jun. 2007.
"Carnauba Wax," 2 pages, prepared at the 51st JEFCA in 1998, published 1998.
Garriga, Mariana Ribas, Evaluation of Natural Wax for Green Packaging Applications, 96 pages, published May 2019.

* cited by examiner

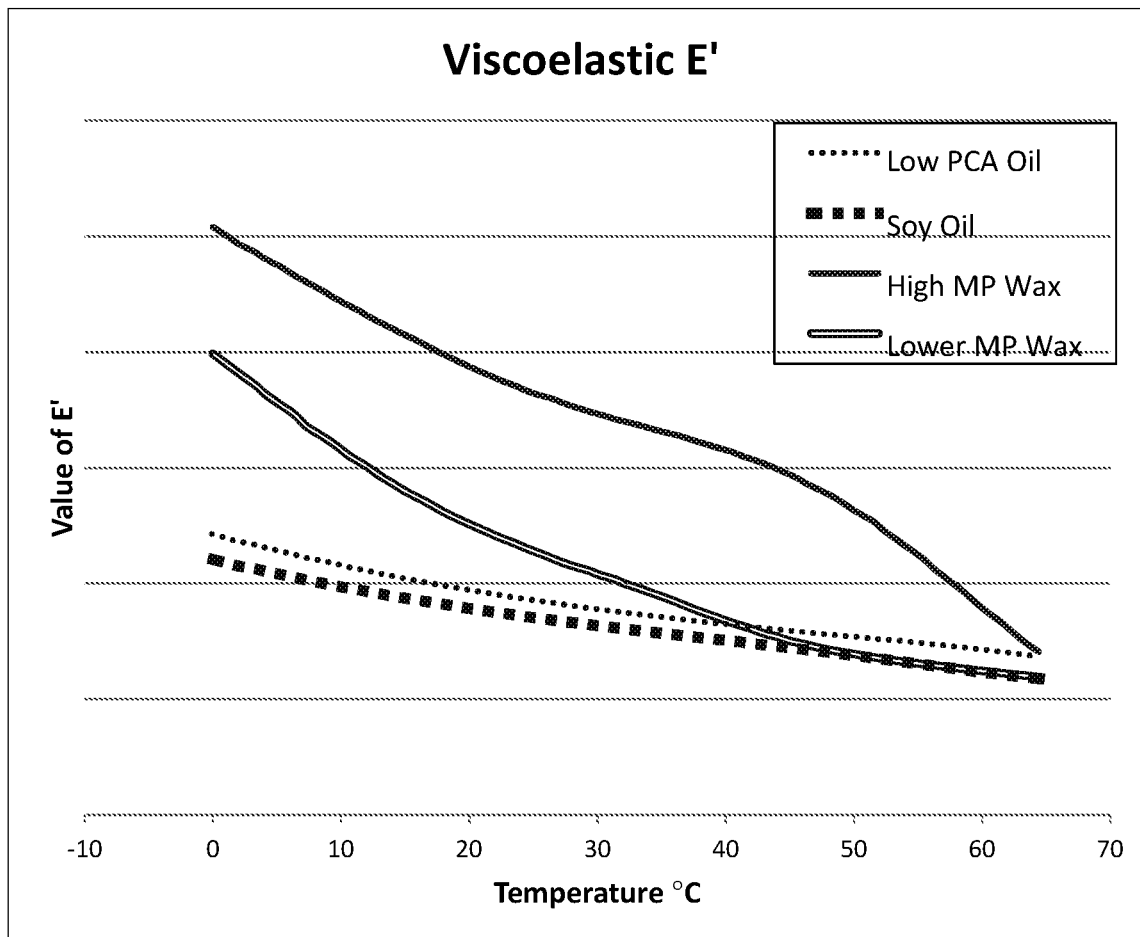
FIGURE 1: E' versus temperature for Examples 1-4

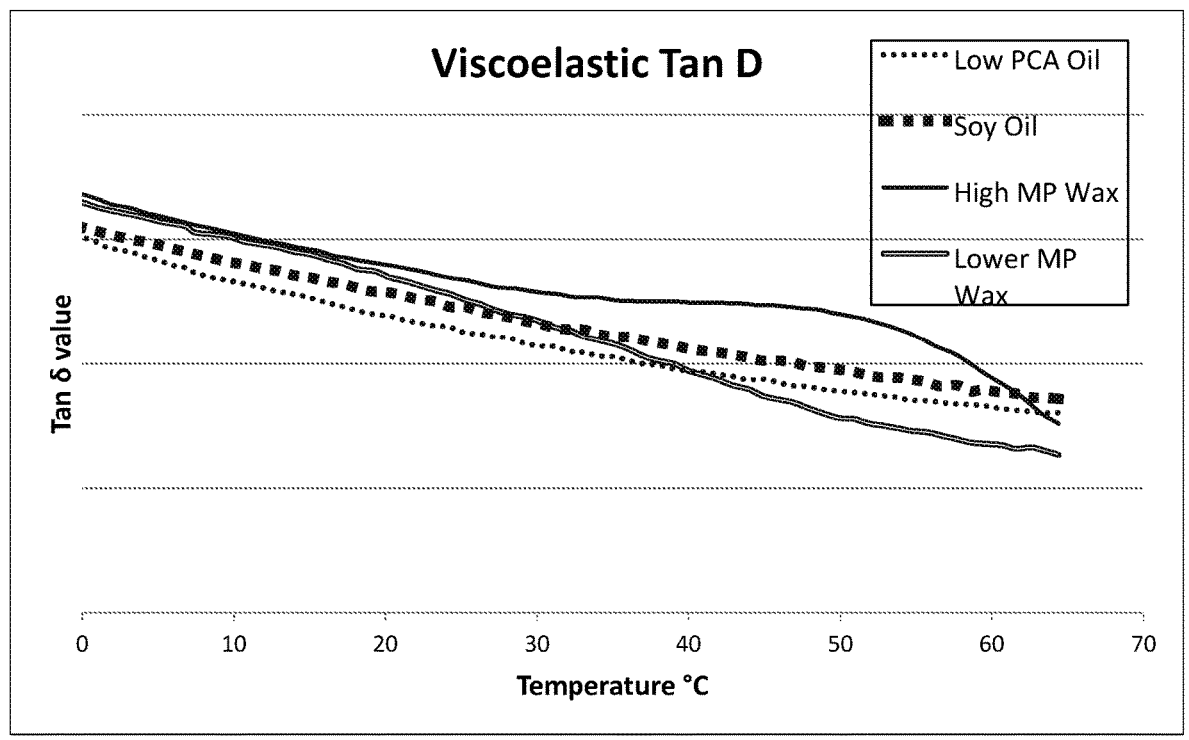
FIGURE 2: Tan δ versus temperature for Examples 1-4

SATURATED TRIGLYCERIDE-CONTAINING RUBBER COMPOSITION, TIRES AND TIRE COMPONENTS CONTAINING THE RUBBER COMPOSITION, AND RELATED METHODS

FIELD

The present application is directed to rubber compositions containing a saturated triglyceride component, tires and tire components containing the rubber composition, and related methods for improving tire performance such as by incorporating the rubber composition into a tire tread.

BACKGROUND

Rubber compositions used to produce tire components may contain various ingredients in addition to their majority ingredients which are generally one or more rubbers in combination with one or more reinforcing fillers such as carbon black and silica. These various other ingredients may positively or negatively impact tire performance properties of the rubber compositions. Measurement of a rubber composition's dynamic mechanical properties such as storage modulus (E') and tangent delta can be used to predict tire performance when the rubber composition is incorporated into a tire tread. However, improvement across properties is often inconsistent or unbalanced. The ability to achieve more consistent improvements in properties is generally desirable but often challenging.

SUMMARY

Disclosed herein are rubber compositions containing a saturated triglyceride component, as well as tires and tire components containing the rubber composition. Also disclosed are methods for improving the performance of a tire tread (such as by improving the wet traction) containing the rubber composition.

In a first embodiment, a rubber composition for use in a tire component is disclosed. The rubber composition comprises: at least one conjugated diene-containing polymer or copolymer, about 1 to about 60 phr of a saturated triglyceride component having a melting point of at least 40° C., and about 5 to about 200 phr of at least one reinforcing filler.

In a second embodiment, a tire comprising at least one component made from a rubber composition according to the first embodiment is disclosed.

In a third embodiment, a method for improving the performance (e.g., the wet traction as measured by tan δ at 0° C.) of a tire tread is disclosed. The method comprises incorporating about 1 to about 60 phr of a saturated triglyceride component having a melting point of at least 40° C. into a rubber composition comprising at least one conjugated diene-containing polymer or copolymer and 5 to 200 phr of at least one reinforcing filler.

BRIEF DESCRIPTION OF THE DRAWINGS

FIG. 1 is a graph showing a plot of E' over a temperature range as indicated therein for Examples 1-4 with the X axis showing temperature in ° C. and the Y axis showing values of E' (with lower values of E' appearing lower on the Y axis).

FIG. 2 is a graph showing a plot of tan δ over a temperature range as indicated therein for Examples 1-4 with the X axis showing temperature in ° C. and the Y axis showing values of tan δ (with lower values of tan δ appearing lower on the Y axis).

DETAILED DESCRIPTION

Disclosed herein are rubber compositions containing a saturated triglyceride component, as well as tires and tire components containing the rubber composition. Also disclosed are methods for improving the performance of a tire tread (such as by improving the wet traction) containing the rubber composition.

In a first embodiment, a rubber composition for use in a tire component is disclosed. The rubber composition comprises: at least one conjugated diene-containing polymer or copolymer, about 1 to about 60 phr of a saturated triglyceride component having a melting point of at least 40° C., and about 5 to about 200 phr of at least one reinforcing filler.

In a second embodiment, a tire comprising at least one component made from a rubber composition according to the first embodiment is disclosed.

In a third embodiment, a method for improving the performance (e.g., the wet traction as measured by tan δ at 0° C.) of a tire tread is disclosed. The method comprises incorporating about 1 to about 60 phr of a saturated triglyceride component having a melting point of at least 40° C. into a rubber composition comprising at least one conjugated diene-containing polymer or copolymer and 5 to 200 phr of at least one reinforcing filler.

Definitions

As used herein, the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, the term "phr" means parts per one hundred parts rubber. The 100 parts rubber can be understood as referring to 100 parts of the at least one conjugated diene-containing polymer or copolymer.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

As used herein, the phrase "saturated triglyceride component" refers to an ingredient containing primarily saturated fatty acid(s) (as opposed to mono- or polyunsaturated fatty acids) in triglyceride form (i.e., three fatty acids bound to a glycerol backbone as opposed to free fatty acids, monoglycerides or diglycerides).

Conjugated Diene-Containing Polymer or Copolymer

As discussed above, according to the first-third embodiments disclosed herein, the rubber composition includes at least one conjugated diene-containing polymer or copolymer. In certain embodiments of the first-third embodiments disclosed herein, the rubber composition can be understood as including 100 parts (or 100 phr) of at least one conjugated diene-containing polymer or copolymer. As used herein, the phrase "conjugated diene-containing polymer or copolymer" refers to a conjugated diene-containing polymer, copolymer, or combination thereof (i.e., more than one polymer, more than one copolymer, one polymer and one copolymer, more than one polymer and one copolymer, more than one copolymer and one polymer, or more than one copolymer and more than one polymer). In accordance with certain embodiments according to the first-third embodiments, the at least one conjugated diene-containing polymer or copolymer is derived from, for example, the polymerization of one or more of the following conjugated diene monomers: 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated diene monomers may be utilized in certain embodiments of the first-third embodiments. In certain embodiments of the first-third embodiments disclosed herein, the at least one conjugated diene-containing polymer or copolymer includes at least one conjugated diene monomer in combination with at least one vinyl aromatic monomer. In accordance with certain embodiments of the first-third embodiments disclosed herein, the at least one conjugated diene-containing polymer or copolymer is a copolymer which results from the polymerization of not only at least one of the foregoing diene monomers but one or more of the following vinyl aromatic monomers: styrene, alpha-methyl styrene, p-methylstyrene, o-methylstyrene, p-butylstyrene, vinylnaphthalene, p-tertbutylstyrene, 4-vinylbiphenyl, 4-vinylbenzocyclobutene, 2-vinylnaphthalene, 9-vinylanthracene, 4-vinylanisole, or vinyl catechol. In certain embodiments of the first-third embodiments disclosed herein, the at least one vinyl aromatic monomer comprises styrene. Non-limiting examples of suitable conjugated diene-containing polymers or copolymers for use in the rubber compositions according to certain embodiments of the first-third embodiments disclosed herein include, but are not limited to, at least one of styrene-butadiene rubber (also referred to as SBR or styrene-butadiene copolymer), polybutadiene, natural rubber, ethylene propylene diene monomer rubber (also known as EPDM rubber), butyl rubber, neoprene, or polyisoprene. In certain embodiments of the first-third embodiments disclosed herein styrene-butadiene copolymer can be understood to mean a copolymer of styrene and butadiene monomers without any other monomers. In certain embodiments of the first-third embodiments disclosed herein, polybutadiene can be understood to mean a homopolymer of butadiene monomers (e.g., 1,3-butadiene); in certain such embodiments, the polybutadiene has a cis bond content of at least 80%, more preferably at least 90%, at least 92% or at least 95%. In certain embodiments of the first-third embodiment disclosed herein, polyisoprene can be understood to mean a homopolymer of isoprene monomers.

In certain embodiments according to the first-third embodiments disclosed herein, the at least one conjugated diene-containing polymer or copolymer of the rubber composition, particularly styrene-butadiene types or polybutadiene types, may comprise a functionalized conjugated diene-containing polymer or copolymer. As used herein, the term "functionalized conjugated diene-containing polymer or copolymer" should be understood to include polymers and copolymers with a functional group at one or both terminus (e.g., from use of a functionalized initiator, a functionalized terminator, or both), a functional group along the main chain of the polymer or copolymer, and combinations thereof. For example, a silica-reactive functionalized elastomer may have the functional group at one or both terminus, in the main chain thereof, or both. In certain such embodiments, the rubber composition comprises about 5 to 100 phr of at least one functionalized conjugated diene-containing polymer or copolymer, including 5 to 100 phr, about 5 to about 90 phr, 5 to 90 phr, about 5 to about 70 phr, 5 to 70 phr, about 5 to about 50 phr, 5 to 50 phr, about 5 to about 40 phr, 5 to 40 phr, about 5 to about 30 phr, 5 to 30 phr, about 10 to about 90 phr, 10 to 90 phr, about 10 to about 70 phr, 10 to 70 phr, about 10 to about 50 phr, 10 to 50 phr, about 10 to about 40 phr, 10 to 40 phr, about 10 to about 30 phr, and 10 to 30 phr. In certain embodiments according to the first-third embodiments disclosed herein, the functionalized conjugated diene-containing polymer or copolymer comprises a conjugated diene-containing polymer or copolymer with a silica-reactive functional group. Non-limiting examples of silica-reactive functional groups that are known to be utilized in functionalizing conjugated diene-containing polymers or copolymers and that are suitable for use in the rubber compositions of certain embodiments of the first-third embodiments include nitrogen-containing functional groups, silicon-containing functional groups, oxygen- or sulfur-containing functional groups, and metal-containing functional groups.

Non-limiting examples of nitrogen-containing functional groups that are known to be utilized in functionalizing conjugated diene-containing polymer or copolymers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the first-third embodiments disclosed herein, the rubber composition comprises a functionalized conjugated diene-containing polymer or copolymer having at least one functional group selected from the foregoing list of nitrogen-containing functional groups.

Non-limiting examples of silicon-containing functional groups that are known to be utilized in functionalizing conjugated diene-containing polymers or copolymers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing conjugated diene-containing polymers or copolymers also include those disclosed in U.S. Pat. No. 6,369,167, the entire disclosure of which is herein incorporated by reference. In certain embodiments according to the first-third embodiments disclosed herein, the rubber composition comprises a functionalized conjugated diene-containing polymer or copolymer having at least one functional group selected from the foregoing list of silicon-containing functional groups.

Non-limiting examples of oxygen- or sulfur-containing functional groups that are known to be utilized in functionalizing conjugated diene-containing polymers or copolymers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group, and a thioketone group. In certain embodiments, the foregoing alkoxy group may be an alcohol-derived alkoxy group derived from a benzophenone. In certain embodiments according to the first-third embodiments disclosed herein, the rubber composition comprises a functionalized conjugated diene-containing polymer or copolymer having at least one functional group selected from the foregoing list of oxygen- or sulfur-containing functional groups.

Generally, conjugated diene-containing polymers and copolymers may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism. All of the above polymerization methods are well known to persons skilled in the art.

Saturated Triglyceride Component

As discussed above, according to the first-third embodiments, a saturated triglyceride component having a melting point of at least 40° C. is included in the rubber composition. One or more than one saturated triglyceride component can be utilized according to embodiments of the first-third embodiment. The saturated triglyceride component refers to an ingredient containing primarily saturated fatty acid(s) (as opposed to mono- or polyunsaturated fatty acids) in triglyceride form (i.e., three fatty acids bound to a glycerol backbone as opposed to free fatty acids, monoglycerides or diglycerides). In certain preferred embodiments of the first-third embodiments disclosed herein, the saturated triglyceride component contains (or comprises) at least 90%, at least 92%, at least 95%, at least 98% or more saturated fatty acid(s) in triglyceride form. In other words, in such embodiments, the amount of saturated fatty acids appearing as free fatty acids, monoglycerides, or diglycerides as well as the amount of unsaturated (mono- and/or polyunsaturated) fatty acids appearing as free fatty acids, monoglycerides, diglycerides or triglycerides is limited to a total of less than 10% by weight, less than 8% by weight, less than 5% by weight, less than 2% by weight, less than 1% by weight, or even 0% by weight (based upon the total weight of the saturated triglyceride component). In certain preferred embodiments of the first-third embodiments disclosed herein, the amount of saturated fatty acids appearing as free fatty acids or a salt thereof, monoglycerides, or diglycerides as well as the amount of unsaturated (mono- and/or polyunsaturated) fatty acids appearing as free fatty acids or a salt thereof, monoglycerides, diglycerides or triglycerides is limited to a total of less than 10% by weight, less than 8% by weight, less than 5% by weight, less than 2% by weight, less than 1% by weight, or even 0% by weight (based upon the total weight of the saturated triglyceride component). According to the first-third embodiments, the saturated triglyceride component (which, as discussed above, contains saturated fatty acids bound to a glycerol backbone) can be contrasted with ingredients such as stearic acid (which is a free fatty acid known for use as a vulcanization activator). Likewise, according to the first-third embodiments, the saturated triglyceride component can be contrasted with soaps or salts of fatty acids (e.g., zinc salts or "soaps" of free fatty acids which are known for use as a processing aid).

In certain embodiments of the first-third embodiments, the rubber composition includes (comprises) about 1 to about 60 phr or 1 to 60 phr (e.g., 5 phr, 10 phr, 15 phr, 20 phr, 25 phr, 30 phr, 35 phr, 40 phr, 45 phr, 50 phr, 55 phr or 60 phr) of the saturated triglyceride component. In certain preferred embodiments of the first-third embodiments, the rubber composition includes (comprises) more than 5 phr of the saturated triglyceride component. In certain such embodiments of the first-third embodiments, the rubber composition includes (comprises) more than 5 phr and up to 60 phr, or more than 5 phr and up to 25 phr (e.g., more than 5 up to 25 phr) of the saturated triglyceride component. In certain embodiments of the first-third embodiments, the rubber composition includes more than 5 phr and up to 55 phr, more than 5 phr and up to 50 phr, more than 5 phr and up to 45 phr, more than 5 phr and up to 40 phr, more than 5 phr and up to 35 phr, or more than 5 phr and up to 30 phr. By stating that more than 5 phr and up to X phr of the saturated triglyceride component can be used it is intended to encompass values of more than 5 phr (e.g., 6 phr, 7 phr, etc) as well as values larger than this and up to X phr (e.g., X−2 phr, X−1 phr, X phr, etc).

In certain embodiments of the first-third embodiments, the melting point of the saturated triglyceride component is 40 to 100° C. (e.g., 40° C., 45° C., 50° C., 55° C., 60° C., 65° C., 70° C., 75° C., 80° C., 85° C., 90° C., 95° C., or 100° C.). In certain embodiments of the first-third embodiments, the melting point of the saturated triglyceride component is at least 60° C., 60 to 100° C. (e.g., 60° C., 65° C., 70° C., 75° C., 80° C., 85° C., 90° C., 95° C., or 100° C.), 60 to about 95° C., 60 to 95° C., 60 to 90° C., 60 to 85° C., 60 to 80° C., or 60 to 75° C. According to the first-third embodiments, when more than one saturated triglyceride component is utilized, each should have a melting point within one of the foregoing ranges.

According to the first-third embodiments disclosed herein, the saturated triglyceride component may comprise one or more than one type of saturated fatty acid triglyceride. In other words, the three fatty acids bonded to a glycerol backbone within the saturated triglyceride component may all be the same fatty acid or may be different fatty acids, and the overall saturated fatty acid component may comprise combination of one or more such saturated triglycerides. In certain embodiments of the first-third embodiments disclosed herein, at least 25% by weight of the saturated fatty acids within the saturated triglyceride component have a chain length of C18 or higher. In certain such embodiments, at least 30%, at least 35%, at least 40%, at least 45%, at least 50%, at least 55%, at least 60%, at least 65%, at least 70%, at least 75%, at least 80%, at least 85%, at least 90%, at least 95%, or even 100% by weight of the saturated fatty acids within the saturated triglyceride component have a chain length of C18 or higher. In certain embodiments of the first-third embodiments disclosed herein, at least 25% by weight of all fatty acids within the saturated triglyceride component comprise saturated fatty acids having a chain length of C18 or higher. In certain such embodiments, at least 30%, at least 35%, at least 40%, at least 45%, at least 50%, at least 55%, at least 60%, at least 65%, at least 70%, at least 75%, at least 80%, at least 85%, at least 90%, at least 95%, or even 100% by weight of the fatty acids within the saturated triglyceride component comprise saturated fatty acids having a chain length of C18 or higher. Exemplary saturated fatty acids having a chain length of C18 or higher include stearic acid (C18:0) which is also known as octadecanoic acid; arachidic acid (C20:0) which is also known as eicosanoic acid; heneicosylic acid (C21:0) which is also known as heneicosanoic acid; behenic acid (C22:0) which is also known as docosanoic acid; tricosylic acid (C23:0) which is also known as tricosanoic acid; lignoceric acid (C24:0) which is also known as tetracosanoic acid; pentacosylic acid (C25:0) which is also known as pentacosanoic acid; cerotic acid (C26:0) which is also known as hexacosanoic acid; heptacosylic acid (C27:0) which is also known as heptacosanoic acid; montanic acid (C28:0) which is also known as octacosanoic acid; nonacosylic acid (C29:0) which is also known as nonacosanoic acid; melissic acid (C30:0) which is also known as triacontanoic acid; henatriacontylic acid (C31:0) which is also known as henatriacontanoic acid; lacceroic acid (C32:0) which is also known as dotriacontanoic acid; psyllic acid (C33:0) which is also known as tritriacontanoic acid; geddic acid (C34:0) which is also known as tetratriacontanoic acid; ceroplastic acid (C35:0) which is also known as pentatriacontanoic acid; and hexatriacontylic acid (C36:0) which is also known as hexatriacontanoic acid. According to certain embodiments of the first-third embodiments disclosed herein, one or more than one of the foregoing C18 or higher saturated fatty acids may be present in one or the foregoing amounts.

In certain embodiments of the first-third embodiments disclosed herein, the saturated triglyceride component comprises saturated plant triglycerides. Various plant sources of saturated and unsaturated plant triglycerides exist including grains, nuts and vegetables. Common plant sources of saturated plant triglycerides include, but are not limited to, soybean oil, palm oil, rapeseed oil, sunflower seed, peanut oil, cottonseed oil, oil produced from palm kernel, coconut oil, olive oil, corn oil, grape seed oil, hazelnut oil, hemp oil, linseed oil, rice oil, safflower oil, sesame oil, mustard oil, or flax oil. Generally, plant sources of saturated plant triglycerides will contain only relatively minor amounts of saturated plant triglycerides and major amounts of unsaturated (mono- and/or polyunsaturated) triglycerides. Therefore, in order to achieve a satisfactory level of saturated plant triglycerides it may be necessary to concentrate or otherwise process one or more plant sources of saturated triglycerides in order to obtain a suitable saturated triglyceride component for use in the first-third embodiments disclosed herein. The most common saturated fatty acids occurring in plant triglycerides include palmitic acid (C16:0) and stearic acid (C18:0). In certain embodiments of the first-third embodiments at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or even 100% by weight of the saturated fatty acids within the saturated triglyceride component comprise C18-C24 saturated fatty acids, palmitic acid, stearic acid, or a combination of palmitic and stearic acid. Alternatively, in certain embodiments of the first-third embodiments at least at least 30%, at least 35%, at least 40%, at least 45%, at least 50%, at least 55%, at least 60%, at least 65%, at least 70%, at least 75%, at least 80%, at least 85%, at least 90%, at least 95%, or even 100% by weight of the fatty acids within the saturated triglyceride component comprise C18-C24 saturated fatty acids, palmitic acid, stearic acid, or a combination of palmitic and stearic acid. One form of processing that may be utilized to obtain a satisfactory level of saturated plant triglycerides in certain embodiments of the first-third embodiments is hydrogenation of unsaturated triglycerides.

In certain embodiments of the first-third embodiments, the saturated triglyceride component comprises saturated animal triglycerides. While sources of animal triglycerides will generally contain higher percentages of saturated triglycerides than source of plant triglycerides, it may still be necessary to concentrate or otherwise process one or more animal sources of saturated triglycerides in order to obtain a suitable saturated triglyceride component for use in the first-third embodiments disclosed herein.

In certain embodiments of the first-third embodiments, the saturated triglyceride component comprises a combination of saturated animal triglycerides and saturated plant triglycerides. Alternatively, in certain embodiments of the first-third embodiments disclosed herein, the saturated triglyceride component may be synthetically produced or contain synthetically produced saturated triglycerides. In yet other embodiments of the first-third embodiments disclosed herein the saturated triglyceride component comprises synthetically produced saturated triglycerides in combination with: saturated animal triglycerides, saturated plant triglycerides or both saturated animal and saturated plant triglycerides.

Reinforcing Filler

As discussed above, according to the first-third embodiments, about 5 to about 200 phr of at least one reinforcing filler is included in the rubber composition. In certain embodiments of the first-third embodiments, the at least one reinforcing filler comprises carbon black, silica, or a combination thereof. By stating that at least one reinforcing filler is utilized is meant that one filler or more than one filler (e.g., two fillers, three fillers, or more) can be utilized. By stating that the at least one reinforcing filler comprises carbon black, silica, or a combination thereof is meant that one or more than one filler can be utilized and that when more than one filler is utilized it can be any combination of carbon black and silica (e.g., one carbon black and one silica, two carbon blacks, two silicas, one carbon black and two silicas, two carbon blacks and two silicas, etc.).

As used herein, the term "reinforcing" as used with respect to the phrases such as "reinforcing filler," "reinforcing carbon black filler," and "reinforcing silica filler" generally should be understood to encompass both fillers that are traditionally described as reinforcing as well as fillers that may be described as semi-reinforcing. Traditionally, the term "reinforcing filler" is used to refer to a particulate material that has a nitrogen absorption specific surface area ($N_2SA$) of more than about 100 $m^2/g$, and in certain instances more than 100 $m^2/g$, more than about 125 $m^2/g$, more than 125 $m^2/g$, or even more than about 150 $m^2/g$ or more than 150 $m^2/g$. Alternatively or additionally, the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area ($N_2SA$), or both, to a non-reinforcing filler and a reinforcing filler. In certain embodiments of the first-third embodiments disclosed herein, the term "reinforcing filler" is used to refer to a particulate material that has a nitrogen absorption specific surface area ($N_2SA$) of about 20 $m^2/g$ or greater, including 20 $m^2/g$ or greater, more than about 50 $m^2/g$, more than 50 $m^2/g$, more than about 100 $m^2/g$, more than 100 $m^2/g$, more than about 125 $m^2/g$, and more than 125 $m^2/g$. In certain embodiments of the first-third embodiments disclosed herein, the term "reinforcing filler" is additionally or alternatively used to refer to a particulate material that has a particle size of about 10 nm up to about 1000 nm, including 10 nm up to 1000 nm, about 10 nm up to about 50 nm, and 10 nm up to 50 nm. Surface area values for carbon black fillers as used in this application can be determined by ASTM Standard Test Method D6556 (as of the time of filing this application most recently issued as D6556-14 in 2014) using a B.E.T. nitrogen absorption method. Surface area values for silica fillers as used in this application can be determined by ASTM Standard Test Method D1993 (as of the time of filing this application most recently issued as D1993-03 (reapproved in 2013)) using a multipoint B.E.T. nitrogen absorption method.

As used herein, the term "non-reinforcing filler" refers to a particulate material that has a nitrogen surface area of less than about 20 $m^2/g$ (including less than 20 $m^2/g$), and in certain embodiments less than about 10 $m^2/g$ (including less than 10 $m^2/g$). The nitrogen surface area of such a non-reinforcing filler particulate material can be determined according to various standard methods (including ASTM D6556 or D3037). In certain embodiments of the first-third embodiments disclosed herein, the term "non-reinforcing filler" is additionally or alternatively used to refer to a particulate material that has a particle size of greater than about 1000 nm (including greater than 1000 nm).

The total amount of reinforcing filler used in the rubber compositions of the first-third embodiments may vary between about 5 and about 200 phr, including 5 to 200 phr (e.g., 5 phr, 10 phr, 15 phr, 20 phr, 25 phr, 30 phr, 35 phr, 40 phr, 45 phr, 50 phr, 60 phr, 70 phr, 80 phr, 90 phr, 100 phr, 110 phr, 120 phr, 130 phr, 140 phr, 150 phr, 160 phr, 170 phr, 180 phr, 190 phr, or 200 phr), about 5 to about 150 phr, 5 to 150 phr, about 5 to about 100 phr, 5 to 100 phr, about 10 to about 150 phr, 10 to 150 phr, about 10 to about 100 phr, 10 to 100 phr, about 20 to about 150 phr, 20 to 150 phr, about 20 to about 100 phr, 20 to 100 phr, about 30 to about 150 phr, 30 to 150 phr, about 30 to about 100 phr, or 30 to 100 phr.

Various carbon blacks in varying amounts are suitable for use in those embodiments of the first-third embodiments which utilize one or more carbon blacks as a filler. In certain embodiments of the first-third embodiments disclosed herein, the rubber composition comprises about 5 to about 100 phr (including 5 to 100 phr) of one or more carbon blacks. In certain embodiments of the first-third embodiments disclosed herein, the total amount of carbon black filler is 5 to 100 phr, including about 10 to about 100 phr, 10 to 100 phr, about 10 to about 90 phr, 10 to 90 phr, about 25 to about 90 phr, 25 to 90 phr, about 35 to about 90 phr, 35 to 90 phr, about 25 to about 80 phr, 25 to 80 phr, about 35 to about 80 phr, or 35 to 80 phr. Generally, suitable carbon black for use in the rubber composition of certain embodiments of the first-third embodiments disclosed herein includes any of the commonly available, commercially-produced carbon blacks, including those having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-third embodiments disclosed herein, the rubber composition includes a mixture of two or more of the foregoing blacks. Typical suitable carbon blacks for use in certain embodiments of the first-third embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred. As those of skill in the art will understand, most carbon blacks are reinforcing fillers. However, non-reinforcing carbon black fillers can alternatively (in one of the foregoing amounts) or additionally (e.g., in combination with one or more reinforcing carbon blacks in a total amount equating to one of the foregoing amounts) be utilized. Non-limiting examples of non-reinforcing carbon blacks include, but are not limited to, thermal blacks or the N9 series carbon blacks (also referred to as the N-900 series), such as those with the ASTM designation N-907, N-908, N-990, and N-991. Various carbon blacks meeting the foregoing are commercially available, including but not limited to Thermax® N990 carbon black from Cancarb Limited (Medicine Hat, Alberta, Canada).

Various silica fillers in varying amounts are suitable for use in those embodiments of the first-third embodiments which utilize one or more silicas as a filler. The amount of silica filler(s) utilized can vary and in certain embodiments of the first-third embodiments disclosed herein, the rubber composition comprises about 5 to about 200 phr of silica filler. One or more than one silica filler may be utilized in the rubber compositions according to the first-third embodiments disclosed herein. In certain embodiments of the first-third embodiments disclosed herein, the total amount of silica filler is 5 to 200 phr, including about 10 to about 200 phr, 10 to 200 phr, about 10 to about 175 phr, 10 to 175 phr, about 25 to about 150 phr, 25 to 150 phr, about 35 to about 150 phr, 35 to 150 phr, about 25 to about 125 phr, 25 to 125 phr, about 25 to about 100 phr, 25 to 100 phr, about 25 to about 80 phr, 25 to 80 phr, about 35 to about 125 phr, 35 to 125 phr, about 35 to about 100 phr, 35 to 100 phr, about 35 to about 80 phr, and 35 to 80 phr of at least one filler. In certain embodiments, the useful upper range for the amount of silica filler can be considered to be somewhat limited by the high viscosity imparted by fillers of this type.

Non-limiting examples of silica fillers suitable for use in the rubber compositions of certain embodiments of the first-third embodiments disclosed herein include, but are not limited to, precipitated amorphous silica, wet silica (hydrated silicic acid), dry silica (anhydrous silicic acid), fumed silica, calcium silicate and the like. Other suitable reinforcing silica fillers for use in rubber compositions of certain embodiments of the first-third embodiments disclosed herein include, but are not limited to, aluminum silicate, magnesium silicate ($Mg_2SiO_4$, $MgSiO_3$ etc.), magnesium calcium silicate ($CaMgSiO_4$), calcium silicate ($Ca_2SiO_4$ etc.), aluminum silicate ($Al_2SiO_5$, $Al_4.3SiO_4.5H_2O$ etc.), aluminum calcium silicate ($Al_2O_3.CaO_2SiO_2$, etc.), and the like. Among the listed reinforcing silica fillers, precipitated amorphous wet-process, hydrated silica fillers are preferred. Such reinforcing silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different reinforcing silica fillers. In certain embodiments of the first-third embodiments disclosed herein, the rubber composition comprises a reinforcing silica filler having a surface area (as measured by the BET method) of about 32 $m^2/g$ to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In certain embodiments of the first-third embodiments disclosed herein, the rubber composition comprises reinforcing silica filler having a pH of about 5.5 to about 7 or slightly over 7, preferably about 5.5 to about 6.8. Some of the commercially available reinforcing silica fillers which can be used in the rubber compositions of certain embodiments of the first-third embodiments disclosed herein include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). As well, a number of useful commercial grades of different reinforcing silica fillers are also available from Degussa Corporation (e.g., VN2, VN3), Rhone Poulenc (e.g., Zeosil™ 1165 MP), and J. M. Huber Corporation.

In certain embodiments of the first-third embodiments disclosed herein, as discussed in more detail below, a reinforcing silica filler comprising a silica that has been pre-treated with a silica coupling agent may be utilized; preferably any pre-treated silica comprises a silica that has been pre-treated with a silane-containing silica coupling agent.

In certain embodiments of the first-third embodiments, at least one additional filler (e.g., in addition to the above-discussed carbon black and/or silica fillers) is present in the rubber composition. The particular amount and type of any such additional filler may vary. Non-limiting examples of suitable additional fillers for use in certain embodiments of the first-third embodiments include, but are not limited to talc, clay, alumina ($Al_2O_3$), aluminum hydrate ($Al_2O_3H_2O$), aluminum hydroxide ($Al(OH)_3$), aluminum carbonate ($Al_2(CO_3)_2$), aluminum nitride, aluminum magnesium oxide ($MgOAl_2O_3$), pyrofilite ($Al_2O_34SiO_2.H_2O$), bentonite ($Al_2O_3.4SiO_2.2H_2O$), boron nitride, mica, kaolin, glass balloon, glass beads, calcium oxide (CaO), calcium hydroxide ($Ca(OH)_2$), calcium carbonate ($CaCO_3$), magnesium hydroxide ($MH(OH)_2$), magnesium oxide (MgO), magnesium carbonate ($MgCO_3$), titanium oxide, titanium dioxide, potassium titanate, barium sulfate, zirconium oxide ($ZrO_2$), zirconium hydroxide [$Zr(OH)_2.nH_2O$], zirconium carbonate [$Zr(CO_3)_2$], crystalline aluminosilicates, reinforcing grades of zinc oxide (i.e., reinforcing zinc oxide), and combinations thereof. The total amount of any such additional filler present in the rubber compositions of the first-third embodiments may vary from about 1 to about 100 phr, including 1 to 100 phr, at least 1 phr, at least 5 phr, at least 10 phr, less than 100 phr, less than 90 phr, less than 80 phr, less than 70 phr, less than 60 phr, less than 50 phr, or amounts within the foregoing.

Other Ingredients

In those embodiments of the first-third embodiments disclosed herein where the rubber composition includes silica filler, the composition will also preferably include (further comprise) one or more silica coupling agents. Silica coupling agents are useful in preventing or reducing aggregation of the silica filler within the rubber composition. Aggregates of the silica filler particles are believed to undesirably increase the viscosity of the rubber composition, and, therefore, preventing this aggregation reduces the viscosity and improves the processibility and blending of the rubber composition.

Generally, any conventional type of silica coupling agent can be used in those embodiments of the first-third embodiments which include one or more silica coupling agents, such as those having a silane and a constituent component or moiety that can react with a polymer, particularly a vulcanizable polymer. The silica coupling agent acts as a connecting bridge between silica and the polymer. Suitable silica coupling agents include those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments of the first-third embodiments, the silica coupling agent is in the form of a pre-treated silica, i.e., a pre-treacted silica has been pre-surface treated with a silane prior to being added to the rubber composition. The use of a pre-treated silica can allow for two ingredients (i.e., silica and a silica coupling agent) to be added in one ingredient, which generally tends to make rubber compounding easier.

The amount of silica coupling agent used in those embodiments of the first-third embodiments which include a silica coupling agent may vary. In certain embodiments of the first-third embodiments disclosed herein, the silica coupling agent is present in an amount sufficient to provide a ratio of the total amount of silica coupling agent to reinforcing silica filler of 1:100 to 1:5 (i.e., 1 to 20 parts by weight per 100 parts of silica), including 1:100 to 1:10, 1:100 to 1:20, 1:100 to 1:25 as well as 1:100 to 1:50. In certain embodiments according to the first-third embodiments disclosed herein, the amount of silica coupling agent in the rubber composition is 0.01 to 10 phr, 0.01 to 5 phr, or 0.01 to 3 phr.

In certain embodiments of the first-third embodiments disclosed herein, the rubber composition may comprise one or more additional ingredients such as oils (processing and extender), waxes, processing aids, tackifying resins, reinforcing resins, antioxidants, peptizers, or a cure package (i.e., at least one of a vulcanizing agent, a vulcanizing accelerator, a vulcanizing additive, a vulcanizing inhibitor, or an anti-scorching agent). In certain embodiments of the first-third embodiments, one or more than one of each of the foregoing types of ingredients may be present in the rubber composition.

Various types of tackifying resins are known to those of skill in the art and may be utilized in the rubber compositions of certain embodiments of the first-third embodiments; these include but not limited to: rosin and its derivatives, hydrocarbon resins, and phenol-formaldehyde resins. One or more than one type as well as one or more than one of each type may be utilized in certain embodiments of the first-third embodiments. As used herein the term "resin" is intended to encompass compounds which are solid (or semi-solid) at room temperature (23° C.) as opposed to being liquid (such as oils) at room temperature. Exemplary types of rosin-type resins include, but are not limited to, gum rosin, wood rosin, tall oil rosin, rosin esters, and combinations thereof. Exemplary types of hydrocarbon resins include, but are not limited to, cyclopentadiene or dicyclopentadiene homopolymer or copolymer resins; terpene/phenol homopolymer or copolymer resins; C5 or C9 fraction homopolymer or copolymer resins; alpha-methylstyrene homopolymer or copolymer resins, and combinations thereof. Exemplary types of phenol-formaldehyde resins include, but are not limited to, those containing alkyl phenols. In certain embodiments of the first-third embodiments, the total amount of tackifying resin used is 1 to 25 phr, including 1 to 20 phr, 1 to 15 phr and 1 to 10 phr. In certain embodiments of the first-third embodiments, the total amount of phenolic resin, acrylic resin, and polyphenylene resin is no more than 25 phr, including no more than 20 phr, no more than 15 phr, no more than 10 phr, and no more than 5 phr.

Various antioxidants are known to those of skill in the art and may be utilized in the rubber compositions of certain embodiments of the first-third embodiments; these include but not limited to phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments of the first-third embodiments. In certain embodiments of the first-third embodiments, the total amount of antioxidant(s) used is 1 to 5 phr.

In certain embodiments of the first-third embodiments, various types of processing and extender oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES 5201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil (including high oleic sunflower oil), safflower oil, corn oil, linseed oil, cotton seed oil, rapeseed oil, cashew oil, sesame oil, camellia oil, jojoba oil, macadamia nut oil, coconut oil, and palm oil. The foregoing processing oils can also be used as an extender oil, i.e., to prepare an oil-extended polymer or copolymer or as a processing or free oil. Generally, for most uses of the rubber compositions in tire components the total amount of oil used (processing oil and extender oil) in the rubber compositions and methods disclosed herein ranges about 1 to about 40 phr, 1 to 40 phr, about 1 to about 20 phr, or 1 to 20 phr. In certain embodiments of the first-third embodiments disclosed herein, the use of the saturated triglyceride component allows for a reduction in the amount of or even elimination of oil (processing and/or extender oil) that would otherwise be utilized in the rubber composition. Accordingly, in certain embodiments of the first-third embodiments disclosed herein, the rubber composition comprises (contains) no more than 10 phr (in total) of petroleum oil, mineral oil, or plant oil; in certain such embodiments, the total amount of petroleum oil, mineral oil, and plant oil in the rubber composition is less than 10 phr, less than 8 phr, less than 5 phr, less than 3 phr, less than 2 phr, less than 1 phr, or even 0 phr. As used herein the term plant oil is used to refer to plant triglycerides which have a melting point of less than 40° C., and frequently less than 30° C., or less than 25° C.

In certain embodiments of the first-third embodiments disclosed herein, the rubber composition includes at least one additional polymer or copolymer (i.e., in addition to the at least one conjugated diene-containing polymer or copolymer) in a minor amount, e.g., 20 phr or less, 10 phr or less, or 5 phr or less. Suitable such additional polymer or copolymers include one or more of the following: styrene-isoprene rubber, butadiene-isoprene-rubber, styrene-isoprene-butadiene rubber, (polychloroprene), ethylene-propylene rubber, acrylonitrile-butadiene rubber (NBR), silicone rubber, fluorinated rubber, polyacrylate rubber (copolymer of acrylate monomer and vinyl ether), ethylene acrylic rubber, ethylene vinyl acetate copolymer (EVA), epichlorohydrin rubbers, chlorinated polyethylene rubbers, chlorosulfonated polyethylene rubbers, nitrile rubber, halogenated nitrile rubber, hydrogenated nitrile rubber, or tetrafluoroethylene-propylene rubber. Examples of fluorinated rubber include perfluoroelastomer rubber, fluoroelastomer, fluorosilicone, and tetrafluoroethylene-propylene rubber.

In certain embodiments of the first-third embodiments, the rubber composition includes (further comprises) a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments of the first-third embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in certain embodiments of the compositions and methods of the first-third embodiments, include but are not limited to, sulfur or peroxide-based curing components. Thus, in certain such embodiments, the cure package includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. In certain embodiments of the first-third embodiments, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in certain embodiments of the compositions and methods of the first-third embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Processes for Preparing Rubber Compositions

The process used to prepare rubber compositions according to the first-third embodiments is not particularly limited. In certain embodiments of the first-third embodiments, the process comprises: preparing a masterbatch from ingredients including the at least one conjugated diene-containing polymer or copolymer, the saturated triglyceride component, the at least one reinforcing filler and any of the optional ingredients discussed above (generally with the exception of any vulcanization agent and vulcanization accelerator) and then preparing a final batch comprising the masterbatch along with any vulcanization agent and vulcanization accelerator(s), thereby resulting in a final rubber composition.

In certain embodiments of the first-third embodiments, the process used to prepare the masterbatch may include more than one masterbatch stage, e.g., an initial masterbatch followed by a secondary masterbatch. In certain such embodiments, a portion of silica filler is added in an initial masterbatch stage (optionally along with a portion of the silane coupling agent) and the remainder of the silica filler in a secondary masterbatch stage (optionally along with a portion of the silane coupling agent). In certain embodiments of the first-third embodiments, the process for preparing the rubber composition further comprises a remill mixing step subsequent to any masterbatch step but prior to preparing the final batch; such a remill mixing step can be helpful in incorporating the silica fillers into the rubber composition.

The preparation of the masterbatch(es) and the final batch may generally involve mixing together the ingredients for the rubber composition (as disclosed above) by methods known in the art, such as, for example, by kneading the ingredients together in a Banbury mixer or on a milled roll. The term masterbatch as used herein is intended to refer to a non-productive mixing stage, which is known to those of skill in the art and generally understood to be a mixing stage where no vulcanizing agents or vulcanization accelerators are added. The term final batch as used herein is intended to refer to a productive mixing stage, which is also known to those of skill in the art and generally understood to be the mixing stage where the vulcanizing agents and vulcanization accelerators are added into the rubber composition.

In certain embodiments of the first-third embodiments, the process includes one or more master batch mixing stages conducted at a temperature of about 130° C. to about 200° C., and the final mixing stage is conducted at a temperature below the vulcanization temperature in order to avoid unwanted pre-cure of the rubber composition. Generally, the temperature of the productive (or final) mixing stage should not exceed about 120° C. and is typically about 40° C. to about 120° C., or about 60° C. to about 110° C. and, especially, about 75° C. to about 100° C.

Tires and Tire Components

As discussed above, the second embodiment disclosed herein is directed to a tire comprising at least one component made from a rubber composition according to the first embodiment. In other words, the tire comprises at least one component made from a rubber composition comprising at least one conjugated diene-containing polymer or copolymer, about 1 to about 60 phr of a saturated triglyceride component having a melting point of at least 40° C., and about 5 to about 200 phr of at least one reinforcing filler. Moreover, the second embodiment should be understood to include all of the variations in the rubber composition according to the first embodiment as discussed above, as if fully set forth in this section. According to the second embodiment, the particular tire component made from a rubber composition according to the first embodiment may vary. In certain embodiments of the second embodiment, the at least one tire component is a tread, subtread, sidewall, bead filler, or body ply skim. In certain preferred embodiments of the second embodiment, the at least one tire component comprises a tread, a bead filler, or both. In certain preferred embodiments of the second embodiment, the at least one tire component is a tread. In certain embodiments of the second embodiment, the tire tread is incorporated into a high-performance tire which can be understood as a tire having a "V" or "Z" speed rating (with a "V" speed rating being up to 240 km/hour or up to 149 miles/hour and a "Z" speed rating being over 240 km/hour or over 149 miles/hour).

Methods for Improving Tire Performance

As discussed above, the third embodiment disclosed herein is directed to a method for improving the performance (e.g., the wet traction as measured by tan δ at 0° C.) of a tire tread. The method comprises incorporating about 1 to about 60 phr of a saturated triglyceride component having a melting point of at least 40° C. into a rubber composition comprising at least one conjugated diene-containing polymer or copolymer and 5 to 200 phr of at least one reinforcing filler. The method of the third embodiment can also be understood as the use of a rubber composition according to the first embodiment in the tread of a tire which results in an improvement in the performance (e.g., the wet traction as measured by tan δ at 0° C.) of the tire tread. Moreover, the methods of the third embodiment should be understood to include all of the variations in the rubber composition of the first embodiment as discussed above, as if fully set forth in this section. According to the third embodiment, the improvement in performance is as compared to a tire tread having a rubber composition with the same ingredients other than having the saturated triglyceride component replaced with an equivalent amount of petroleum oil, preferably a low PCA petroleum oil or a naphthenic oil. As those of skill in the art will understand, the wet traction performance of a rubber composition when incorporated into (used as) a tire tread can be predicted by measuring the tan δ at 0° C. of the rubber composition. Various methods can be utilized for measuring tan δ at 0° C. and the values provided herein are measured according to the procedure described in the Examples. The particular amount of improvement in wet traction (as measured by tan δ at 0° C.) achieved by the method of the third embodiment may vary. An improvement in wet traction will be evidenced by an increase in the value of tan δ at 0° C. In certain embodiments of the third embodiment, the improvement in wet traction (as measured by tan δ at 0° C.) is at least 3%, at least 4%, at least about 5%, at least 5%, at least 6%, at least 7%, at least 8%, at least 9%, at least about 10%, at least 10%, at least 15%, at least 20%, at least 25%, or more. In certain embodiments of the third embodiment, the improvement in wet traction (as measured by tan δ at 0° C.) is at least 3% to about 10%, at least 3% to 15%, at least 3% to 20%, or at least 3% to 25%.

In certain embodiments of the third embodiment, at least one additional aspect of performance of the tire tread is improved such as dry traction (as measured by tan δ at 30° C.), handling (as measured by E' at 30° C.), or rolling resistance (as measured by tan δ at 60° C.). According to the third embodiment, the foregoing aspects of improved performance are as compared to a tire tread having a rubber composition with the same ingredients other than having the saturated triglyceride component replaced with an equivalent amount of petroleum oil, preferably a low PCA petroleum oil or a napthenic oil. As those of skill in the art will understand, the dry traction performance of a rubber composition when incorporated into (used as) a tire tread can be predicted by measuring the tan δ at 30° C. of the rubber composition, the handling can be predicted by measuring E' at 30° C., and the rolling resistance can be predicted by measuring tan δ at 30° C. Various methods can be utilized for measuring each of these properties, and the values provided herein are measured according to the procedures described in the Examples.

In those embodiments of the third embodiment wherein an improvement in dry traction (as measured by tan δ at 30° C.) is achieved, the particular amount of improvement may vary. An improvement in dry traction will be evidenced by an increase in the value of tan δ at 30° C. In certain such embodiments of the third embodiment, the improvement in dry traction (as measured by tan δ at 30° C.) is at least 3%, at least 4%, at least about 5%, at least 5%, at least 6%, at least 7%, at least 8%, at least 9%, at least about 10%, at least 10%, at least 15%, at least 20%, at least 25%, or more. In certain embodiments of the third embodiment, the improvement in dry traction (as measured by tan δ at 30° C.) is at least 3% to about 10%, at least 3% to 15%, at least 3% to 20%, or at least 3% to 25%.

In those embodiments of the third embodiment wherein an improvement in handling (as measured by E' at 30° C.) is achieved, the particular amount of improvement may vary. An improvement in handling will be evidenced by an increase in the value of E' at 30° C. In certain such embodiments of the third embodiment, the improvement in handling (as measured by E' at 30° C.) is at least 5% (e.g., 5%, 10%, 15%, 20%, 25%, 30%, 35%, 40%, 45%, 50%, 55%, 60%, 65%, 70%, 75%, 80%, 85%, 90%, 95% or 100% or more), at least 10%, at least about 15%, at least 20%, at least 30%, at least 40%, at least 50%, at least 60%, at least about 70%, at least 80%, at least 90%, or more. In certain embodiments of the third embodiment, the improvement in dry traction (as measured by E' at 30° C.) is at least 5% to 100%, at least 10% to 100%, at least 15% to 100%, at least 5% to about 90%, at least 10% to about 90%, or at least 15% to about 90%. In certain embodiments of the third embodiment wherein an improvement in handling (as measured by E' at 30° C.) is desired, the saturated triglyceride component is limited to one having a melting point of at least 60° C., 60° C. to about 95° C., 60 to 95° C., 60 to about 98° C., or 60 to 98° C.

In those embodiments of the third embodiment wherein an improvement in rolling resistance (as measured by tan δ at 60° C.) is achieved, the particular amount of improvement may vary. An improvement in rolling resistance will be evidenced by a decrease in the value of tan δ at 60° C. When an improvement in rolling resistance is desired, the saturated triglyceride component may be limited to one having a melting point of 40° C. to about 55° C., 40 to 55° C., or 40 to less than 60° C. In certain embodiments of the third embodiment, the improvement in rolling resistance (as measured by tan δ at 60° C.) is at least 3%, at least 4%, at least about 5%, at least 5%, at least 6%, at least 7%, at least 8%, at least 9%, at least about 10%, at least 10%, at least 15%, at least 20%, at least 25%, or more. In certain embodiments of the third embodiment, the improvement in rolling resistance (as measured by tan δ at 60° C.) is at least 3% to about 10%, at least 3% to 15%, at least 3% to 20%, or at least 3% to 25%.

Although the improvements in tire performance are described above with respect to the methods of the third embodiment, it should be understood that certain embodiments of the rubber compositions of the first and second embodiments disclosed herein can also exhibit similar or equivalent improvements in tire performance properties. Accordingly, the above discussion of improvements in properties such as E' at 30° C. and tan δ at 0, 30 and 60° C. should be understood to be equally applicable to certain embodiments of the rubber compositions of the first and second embodiments.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. It should specifically be understood that the saturated triglyceride components utilized in the examples can be utilized with rubbers, fillers, and other ingredients which differ in amount, composition, or both from those used in the examples (i.e., as fully disclosed in the preceding paragraphs). Moreover, saturated triglyceride components can be utilized in amounts, relative amounts, from sources, and having properties (e.g., a different melting point) that differ from those used in the examples (i.e., as fully disclosed in the preceding paragraphs).

Examples 1-4

In Examples 1-4, rubber compositions were prepared using combinations of three conjugated diene-containing polymers and copolymers, along with carbon black and silica as reinforcing fillers and either low PCA petroleum oil, soy oil, or a saturated triglyceride component as well as the additional ingredients appearing in Table 1. Examples 3 and 4 are provided as working examples of the present disclosure and each utilize a saturated triglyceride component. Examples 1 and 2 are comparative examples which lack any saturated triglyceride component but instead include an equivalent amount of either low PCA petroleum oil (Example 1) or soy oil (Example 2). The saturated triglyceride components used were obtained from Cargill, Incorporated and are sold under the Agri-Pure® tradename. The saturated triglyceride component used in Example 3 was designated AP-660 and described by its supplier as having a melting point of 64° C. The saturated triglyceride component used in Example 4 was designated AP-660-50M and described by its supplier as having a melting point of 43° C. The rubber compositions were prepared in a three stage mixing process (i.e., two master-batch stages, and final batch) according to the formulations shown in Table 1. The amount of each ingredient used is reported as parts per hundred rubber (phr). The mixing process used for these formulations is outlined in Table 2 below. Each of Examples 3 and 4 should be understood as containing 15 phr of saturated triglyceride component, with the stearic acid of the vulcanization activator #1 and the processing aid comprising zinc salts of fatty acids not being considered to constitute or comprise any portion of a saturated triglyceride component.

TABLE 1

|  | Sample # | | | |
| --- | --- | --- | --- | --- |
|  | 1 (Control) | 2 (Control) | 3 | 4 |
| Master-Batch First non-productive | | | | |
| Styrene-butadiene copolymer | 50 | 50 | 50 | 50 |
| Natural rubber | 10 | 10 | 10 | 10 |
| Polybutadiene | 40 | 40 | 40 | 40 |
| Carbon black (N134) | 15 | 15 | 15 | 15 |
| Silica | 36 | 36 | 36 | 36 |
| Silane | 2.8 | 2.8 | 2.8 | 2.8 |
| Low PCA oil | 15 | 0 | 0 | 0 |
| Soy oil | 0 | 15 | 0 | 0 |
| Saturated triglyceride component #1 | 0 | 0 | 15 | 0 |
| Saturated triglyceride component #2 | 0 | 0 | 0 | 15 |
| Vulcanization activator #1 (stearic acid) | 2 | 2 | 2 | 2 |
| Processing aid[1] | 5 | 5 | 5 | 5 |
| Second non-productive stage | | | | |
| Silica | 24 | 24 | 24 | 24 |
| Silane | 1.9 | 1.9 | 1.9 | 1.9 |
| Antioxidant | 1 | 1 | 1 | 1 |
| Final Batch | | | | |
| Vulcanizing agent | 1.85 | 1.85 | 1.85 | 1.85 |
| Vulcanization activator #2 | 2 | 2 | 2 | 2 |
| Vulcanizing accelerators | 3.7 | 3.7 | 3.7 | 3.7 |
| Total phr | 210.25 | 210.25 | 210.25 | 210.25 |

[1]Processing aid comprising zinc salts of fatty acids.

TABLE 2

| Mixing Parameters | | |
| --- | --- | --- |
| Stage | Time | Condition |
| Masterbatch | 0 seconds | Charge polymers |
| Stage 1 (initial temp: 65° C., rotor rpm started at 65) | 30 seconds | Charge ingredients as indicated in Table 1, increase rotor to 75 rpm Drop based on max temperature of 311° F. (155° C.) |
| Masterbatch Stage 2 (initial temp: 65° C., rotor rpm started at 65) | 0 seconds | Charge additional ingredients listed under Secondary Masterbatch in Table 1. Drop based on max temperature of 311° F. (155° C.) |
| Final Batch Stage (initial temp: 65° C., rotor rpm at 65) | 0 seconds 0 seconds | Charge Remill Charge curatives Drop based on max temperature of 210° F. (99° C.) |

After curing at 170° C. for 15 minutes, each of the rubber compositions was tested for tensile properties. Results are shown in Table 3 below wherein the abbreviation E' is used for dynamic storage modulus, which provides a measure of the hardness of the rubber composition; steering stability on a dry road surface (dry performance) is generally impacted by E' with higher values preferred. An improvement in E' at 30° C. can, thus, be understood as indicative of an improvement in handling when the rubber composition is incorporated into a tire tread. The index values listed in Table 3 were determined by comparing the value for the formulation according to the present disclosure with the respective value for control example 1 (i.e., dividing the test value for example 2, 3 or 4 by the value for example 1).

Tensile mechanical properties of the samples were determined following the guidelines, but not restricted to, the standard procedure described in ASTM D-412, using dumbbell-shaped samples with a cross-section dimension of 4 mm in width and 1.9 mm in thickness at the center. Specimens were strained at a constant rate and the resulting force was recorded as a function of extension (strain). Force readings are shown in the Tables below as engineering-stresses by reference to the original cross-sectional area of the test piece. The specimens were tested at 25° C. unless indicated to the contrary.

The viscoelastic temperature sweep for the tan δ measurements was conducted using a dynamic mechanical thermal spectrometer (Eplexor® 500N from Gabo Qualimeter Testanlagen GmbH of Ahiden, Germany) under the following conditions: measurement mode: tensile test mode, measuring frequency: 52 Hz, applying 0.2% strain from 50 to −5° C. and 1% strain from −5 to 65° C., measuring temperatures (0° C., 30° C. and 60° C.), sample shape: 4.75 mm wide×29 mm long×2.0 mm thick. A rubber composition's tan δ at 0° C. is indicative of its wet traction when incorporated into a tire tread, its tan δ at 30° C. is indicative of its dry traction when incorporated into a tire tread and its tan δ at 60° C. is indicative of its rolling resistance when incorporated into a tire tread. Higher values of tan δ at 0° C. and 30° C. are beneficial (indicating improved wet and dry traction) whereas lower values of tan δ at 60° C. are beneficial (indicating reduced rolling resistance which equates to improved fuel economy).

The viscosities disclosed herein are real dynamic viscosities determined using an Alpha Technologies RPA (Rubber Process Analyzer) instrument which is rotorless.

Measurements were made following the guidance of, but not strictly according to ASTM D 6204. In accordance with ASTM D 6204, a three point frequency sweep was conducted. The rubber compositions were pre-heated for 1 minute at 130° C. In accordance with the ASTM procedure, strain sweep was conducted at 130° C., strain at 100 percent, and 1 Hz were conducted. The viscosity data reported is from a run conducted at 266° F., G' at 0.2 minutes.

TABLE 3

|  | Sample # | | | |
| --- | --- | --- | --- | --- |
|  | 1 (Control) | 2 (Control) | 3 | 4 |
| E' at 30° C. | 1.00 | 0.92 | 1.95 | 1.17 |
| Indexed tan δ at 0° C. | 1.00 | 1.02 | 1.07 | 1.06 |
| Indexed tan δ at 30° C. | 1.00 | 1.04 | 1.10 | 1.05 |
| Indexed tan δ at 60° C. | 1.00 | 1.04 | 1.06 | 0.92 |
| Indexed viscosity | 1.00 | 0.92 | 0.95 | 0.94 |

As can be seen from the data of Table 3, E' at 30° C. is improved (higher) for Examples 3 and 4 as compared to control Example 1. A larger relative improvement in E' at 30° C. was exhibited in the rubber composition having the higher melting point (64° C.) saturated triglyceride component (Example 3). Both examples 3 and 4 exhibited an improvement (increase) in tan δ at 0° C. and at 30° C. as compared to control Example 1. Likewise, both example 3 and 4 exhibited a decrease in viscosity as compared to control Example 1. The rubber composition having the lower melting point saturated triglyceride component (43° C.) exhibited an improvement (decrease) in tan δ at 60° C. as compared to control Example 1 whereas the rubber composition having the higher melting point triglyceride component (64° C.) did not exhibit any improvement but instead exhibited an increase in its value of tan δ at 60° C.

Graphs showing plots of E' and tan δ values over a temperature range of 0 to about 60° C. are included as FIGS. 1 and 2, respectively. As can be seen from FIG. 1, the rubber composition having the higher melting point (64° C.) saturated triglyceride component (Example 3) exhibited a mostly consistently higher E' than control Example 1 until exhibiting a steeper decrease around 45-50° C. which led to E' at about 65° C. being at or below the E' for control Example 1. As can also be seen from FIG. 1, the rubber composition having the lower melting point (43° C.) saturated triglyceride component (Example 4) exhibited a mostly consistently higher E' than control Example 1 until exhibiting a steeper decrease around 15-20° C. which led to E' at about 40° C. and higher being at or below the E' for control Example 1. As can be seen from FIG. 2, the rubber composition having the higher melting point (64° C.) saturated triglyceride component (Example 3) exhibited a higher tan δ than control Example 1 until exhibiting a sharper decrease around 55° C. which led to its tan δ above about 65° C. being at or below the E' for control Example 1. As can also be seen from FIG. 2, the rubber composition having the lower melting point (43° C.) saturated triglyceride component (Example 4) exhibited a higher tan δ than control Example 1 until decreasing to below the tan δ for the control Example 1 at just over 40° C. As shown by the plots in FIGS. 1 and 2 it was unexpectedly discovered that it is possible to control the inflection point at which E' or tan δ intersects with the control value by changing the melting point of the saturated triglyceride component.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A tire tread rubber composition, comprising:
    at least one conjugated diene-containing polymer or copolymer including at least one of: styrene-butadiene copolymer, polybutadiene polymer, natural rubber, or polyisoprene, greater than 30 to 60 phr of a saturated triglyceride component having a melting point of greater than 40° C. and at least 90% by weight saturated fatty acids in triglyceride form, 50 to 200 phr of at least one reinforcing filler including at least one of carbon black or silica, and a cure package, wherein the rubber composition comprises less than 10 phr in total of petroleum oil, mineral oil, and plant oil.

2. The tire tread rubber composition of claim 1, wherein the saturated triglyceride component comprises saturated plant triglycerides.

3. The tire tread rubber composition of claim 1, wherein the saturated triglyceride component has a melting point of 60 to about 95° C.

4. The tire tread rubber composition of claim 1, wherein the saturated triglyceride component comprises at least 95% by weight saturated fatty acids in triglyceride form.

5. The tire tread rubber composition of claim 1, wherein at least 30% by weight of saturated fatty acids within the saturated triglyceride component have a chain length of C18 or higher.

6. The tire tread rubber composition of claim 1, wherein at least 50% by weight of saturated fatty acids within the saturated triglyceride component have a chain length of C18 or higher.

7. A tire tread rubber composition, comprising:

at least one conjugated diene-containing polymer or copolymer including at least one of: styrene-butadiene copolymer, polybutadiene polymer, natural rubber, or polyisoprene, 5 to 60 phr of a saturated triglyceride component having a melting point of greater than 60 to about 95° C. and at least 90% by weight saturated fatty acids in triglyceride form, 50 to 200 phr of at least one reinforcing filler including at least one of carbon black or silica, and a cure package, wherein the rubber composition comprises less than 10 phr in total of petroleum oil, mineral oil, and plant oil.

8. The tire tread rubber composition of claim 7, wherein the saturated triglyceride component comprises saturated plant triglycerides.

9. The tire tread rubber composition of claim 7, wherein the saturated triglyceride component has a melting point of 65 to about 95° C.

10. The tire tread rubber composition of claim 7, wherein the saturated triglyceride component has a melting point of greater than 60 to 80° C.

11. The tire tread rubber composition of claim 7, wherein the saturated triglyceride component comprises at least 95% by weight saturated fatty acids in triglyceride form.

12. The tire tread rubber composition of claim 7, wherein at least 30% by weight of saturated fatty acids within the saturated triglyceride component have a chain length of C18 or higher.

13. The tire tread rubber composition of claim 7, wherein at least 50% by weight of saturated fatty acids within the saturated triglyceride component have a chain length of C18 or higher.

* * * * *